Nov. 30, 1943.  V. EHRENHAFT  2,335,400
PROCESS FOR THE MANUFACTURE OF HOLLOW BODIES
Filed Aug. 19, 1939
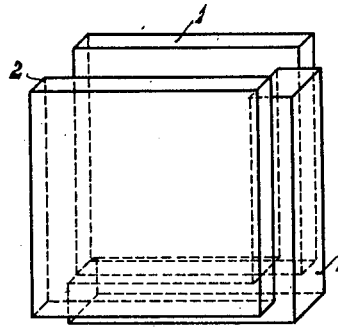
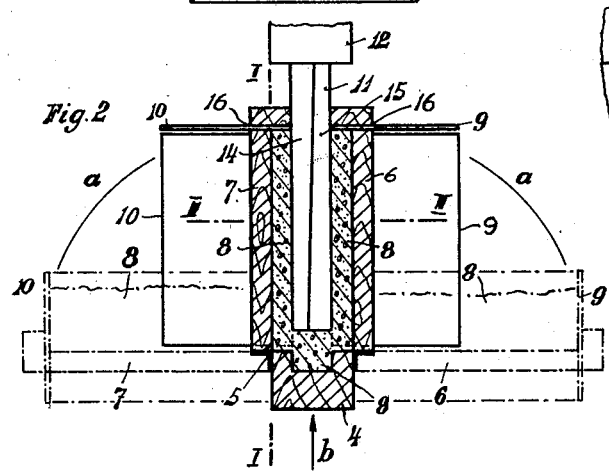
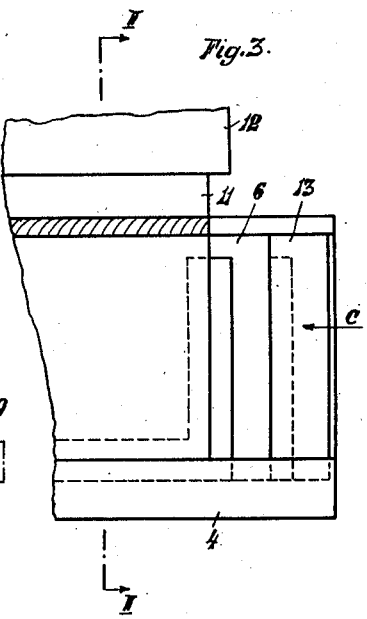
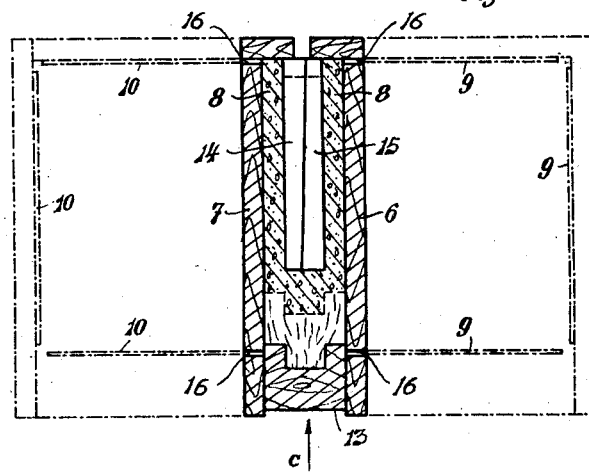
Inventor
Viktor Ehrenhaft
By C. A. Onen.

Patented Nov. 30, 1943

2,335,400

UNITED STATES PATENT OFFICE 2,335,400

PROCESS FOR THE MANUFACTURE OF HOLLOW BODIES

Viktor Ehrenhaft, Brunn, Moravia; vested in the Alien Property Custodian

Application August 19, 1939, Serial No. 290,985

3 Claims. (Cl. 18—55)

This invention relates to a process for the manufacture of hollow bodies for building purposes, which bodies are made of some moldable material, for example, some porous building material, such as wood wool, wood fibres, wood chips, peat wool and the like, bound together by some adhesive. Although this process is not confined to the manufacture of hollow bodies of some definite shape, the said process will be now explained in connection with the manufacture of a molded body consisting of two sheets parallel to, and spaced from, one another and interconnected by a cross beam of angular shape interconnecting the two plates so that the said beam will by a certain length extend beyond the said plates, the said plates and beam forming one piece.

In the drawing, Fig. 1 is a perspective view of such hollow body according to the invention. The said body consists of prismatic plates 1 and 2, parallel and adjacent to, and spaced from, one another and an angular beam 3 interconnecting the said plates 1 and 2.

The process for the manufacture of such body may be seen from Figs. 2 to 4, Fig. 2 showing on line II—II of Fig. 3 a section of the mold, in which the body is formed. Fig. 3 is a section on line I—I of Fig. 2 and shown in elevation. Fig. 4 is a plan section on line III—III of Fig. 2.

The mold is formed of a beam 4 which, for example, is made from wood and on which plates 6 and 7 are pivoted at 5. For the purpose of forming the body, the mold is opened, the plates 6 and 7 dropping into the position shown in dotted lines in Fig. 2. The said plates will thus lie horizontally, so that the material 8 previously produced by mixing its ingredients may be poured out upon the three parts 4, 6 and 7 of the mold. If the layer of material poured out is of substantial height, care must be taken to prevent material from escaping laterally. For that purpose, the plates 6 and 7 are provided within their side and top edges, as shown in Fig. 4, with slits 16 through which sheets 9 and 10 are passed. The material is thereby laterally delimited. For the formation of the space between plates 1 and 2, a core 11 consisting of two parts 14, 15 is inserted into the mold. Such parts are preferably formed like wedges, as shown in Figs. 2 and 4. Such formation of the core is chosen in order to facilitate taking apart of the mold. The core is retained within the mold by a clamping device 12 not specified and not shown in respect to its details. These preparations having been made, compression of the material is effected by turning upward the side parts 6 and 7 of the mold about the axes of rotation 5, so that their position becomes vertical, as shown in Figs. 2 to 4, parts 6 and 7 enclosing core 11. When the mold is closed, the sheets 9 and 10 are adjacent to the core 11 and in this position are forced backward through the slits engaging them. The mold being closed, these sheets may be removed from the said slits. While the mold is being closed or after such closing, compression of the material below the core may be effected. Such compression may take place in two manners, one of which is indicated by arrows $b$ in Fig. 2. The closed mold is forced against the retained core 11, so that this core will be displaced relatively to the mold and the material 8 compressed accordingly and that until the desired shape of the body is attained.

The other possible course is to place the core into a stationary mold so that it may be shifted therein and to press this shiftable core into the mold, thereby compressing the building material.

When forming the body according to Fig. 1, it is necessary during compression to exert pressure on the material in the direction $c$ shown by arrows in Fig. 3. For that purpose, a beam 13 is loosely inserted between the fixed plates 6 and 7. This beam is displaced in a horizontal direction so that it may better penetrate into the depth of the mold. Pressure in direction $c$ may be dispensed with in the case of bodies which are to be given another shape, without thereby altering the nature of the invention.

What I claim is:

1. Process of manufacturing hollow bodies for building purposes from a porous building material made from a compressible material as wood wool, wood fibres, wood chips, peat wool and the like, and binding means for said compressible material, said process comprising the steps of forming on an open mold consisting of a bottom part and two side parts connected by hinges with said bottom part, a continuous layer of said building material in uncompressed state, the thickness of said layer being greater than the wall thickness of the finished hollow body, introducing a core within said form, compressing said layer by turning the side parts of said mold around said hinges and simultaneously enclosing said core in said mold, thus bending and compressing the continuous building material layer into the required shape.

2. Process of manufacturing hollow bodies for building purposes from a porous building material made from a compressible material as wood wool, wood fibres, wood chips, peat wool and the like, and binding means for said compressible material, said process comprising the steps of forming on an open mold consisting of a bottom part and two side parts connected by hinges with said bottom part, a continuous layer of said building material in uncompressed state, the thickness of said layer being greater than the wall thickness of the finished hollow body, introducing a core within said form, compressing said layer by turning the side parts of said mold around said hinges and enclosing said core in said mold, and moving thereafter said core and said mold relatively to each other in such a way as to exert additional pressure on said building material layer enclosed between said mold and said core, thus by the combined action of turning said mold parts and moving said core and mold relatively to each other attaining a bending and compressing of the continuous building material layer into the required shape.

3. Process of manufacturing hollow bodies for building purposes from a porous building material made from a compressible material as wood wool, wood fibres, wood chips, peat wool and the like, and binding means for said compressible material, said process comprising the steps of forming on an open mold consisting of a bottom part and two side parts connected by hinges with said bottom part, a continuous layer of said building material in uncompressed state, the thickness of said layer being greater than the wall thickness of the finished hollow body, introducing a core within said form, compressing said layer by turning the side parts of said mold around said hinges and exerting additional pressure against an edge portion of the continuous building material layer by introducing a loose beam between the side parts of said mold after the same have been turned around their hinges, thus bending and compressing the continuous building material layer into the required shape.

VIKTOR EHRENHAFT.